United States Patent [19]

Tsutsumi

[11] Patent Number: 4,675,698

[45] Date of Patent: Jun. 23, 1987

[54] THERMAL TRANSFER RECORDING METHOD

[75] Inventor: Teruo Tsutsumi, Tama, Japan

[73] Assignee: 501 Kabushiki Kaisha Toshiba, Kawasaki, Japan

[21] Appl. No.: 775,258

[22] Filed: Sep. 12, 1985

[30] Foreign Application Priority Data

Nov. 30, 1984 [JP] Japan ................................ 59-254332

[51] Int. Cl.[4] ................................ G01D 15/10

[52] U.S. Cl. ................................ 346/76 PH; 346/105; 400/120

[58] Field of Search .................. 346/76 PH, 134, 136, 346/105; 400/120, 507, 511.2, 518.4; 219/216 PH; 250/318

[56] References Cited

U.S. PATENT DOCUMENTS 3,354,822 11/1967 Dollot ................................ 400/224.2

4,558,963 12/1985 Applegate ................................ 400/232

*Primary Examiner*—Arthur G. Evans

*Attorney, Agent, or Firm*—Finnegan, Henderson Farabow, Garrett & Dunner

[57] ABSTRACT

In a thermal transfer recording method of the type using a strip of repeatedly usable ink ribbon wound about an ink ribbon feeding roll, recording is effected by means of a line scanning type thermal head while recording paper and ink ribbon are transported forwardly in the superimposed state. At every time when recording has been achieved both the recording paper and the ink ribbon are released from the clamped state which is caused by means of a combination of platen roller and thermal head and thereafter the ink ribbon is transported backwardly by a distance shorter than the length of a single page. A short part of the ink ribbon transported backwardly on which recording has been effected is put in use again for next recording operation.

2 Claims, 6 Drawing Figures

THERMAL TRANSFER RECORDING METHOD

BACKGROUND OF THE INVENTION

1. Field of the Invention

The present invention relates to thermal transfer recording method and more particularly to an improved thermal transfer recording method of the type including ink ribbon which can be repeatedly used.

2. Description of the Prior Art

In the hitherto known facsimile apparatus, as means for receiving image informations of an original and recording them, electrostatic recording method and thermal transfer recording method are mainly employed for the signal receiving and recording mechanism. The electrostatic recording method has an advantageous feature that recording can be effected at a high speed with high image resolvability, but it has drawbacks that the apparatus using this method is complicated and expensive because developing and fixing of images are required. In addition, recording paper used in this apparatus is expensive, resulting in comparatively increased running cost. On the other hands, the thermal transfer recording method has advantageous features that developing and fixing of images are not required because the image is built by primary coloring under the effect of heating and an apparatus using this method can be constructed in the comparatively simple manner, but it has drawbacks that recording papers are of specially produced type which have less durability and the images recorded thereon can be falsified relatively easily.

In view of the problem inherent to the recording methods as described above, it has been proposed the thermal transfer recording apparatus for a facsimile equipment in which inexpensive ordinary paper is employed as recording medium. The thermal transfer recording apparatus of this type is operated such that recording paper made of ordinary paper and ink ribbon serving as master recording material and comprising a base film made of paper, plastic or the like material with a layer of thermally fusible solid ink containing coloring agent coated thereon are superimposed one above another so that the ink layer comes in contact with the recording paper and they are transported in a certain direction while the base film is depressed by means of a platen roller so as to allow it to come in contact with heating resistor elements of a thermal head. When pulse electric current is selectively caused to flow through the heating resistor elements in response to signals representing an image to be recorded, heat is generated at the heating resistor elements. The generated heat is transmitted to the solid ink layer through the base film of ink ribbon. Thus, the solid ink layer becomes in a semi-fused state a viscous. The semi-fused ink is transferred to recording paper under the influence of pressure given by the platen roller whereby a permanent image is built on the paper.

Since this type of recording apparatus uses ordinary paper as recording medium and does not require processes of developing and fixing, running cost can be reduced considerably and can be manufactured in a simple construction, in smaller dimensions and at an inexpensive cost. Further, since coloring agent having excellent weather proofness is used for the ink which is transferred only onto a required area on the paper, the recording paper and the recorded images are durable for a longer time and falsification of the recorded image is difficult to make compared with the foregoing heat sensitive recording apparatus.

However, it has been pointed out that the existent thermal transfer recording apparatuses fail to satisfactorily meet a variety of requirements for receiving and recording image signals, when used in a facsimile apparatus.

Generally, the conventional facsimile machine is adapted to handle originals having a variety of lengths and therefore the receiving apparatus is required to effect recording in which the recorded paper has the same length as that of the original. For the reason, it is preferable to use a roll of recording paper wound about a core as recording medium and automatically cut it off by the same length as that of an original by actuating an automatic cutter after completion of recording operation of received signal informations. However, in the case where the conventional thermal transfer recording system is applied to a receiving apparatus of a facsimile, sheet papers cut to a predetermined length, for instance, the length of A4 (29.7 cm) or B4 (36.4 cm) are usually used as recording medium, the length of an original of which image signal can be perfectly transmitted to the receiving apparatus is limited within the extent of the length of a single sheet paper or shorter than the length of the same. Further, the conventional facsimile receiving apparatus is constructed such that the length of ink ribbon is determined equal to the length of recording paper in the one-to-one relation. Therefore, when image informations of an original whose length is shorter than the length of a recording sheet paper are received by the facsimile receiving apparatus, both the ink ribbon and the recording paper are caused to have a blank area which is not concerned with recording. However, this is not preferable and acceptable from the viewpoint of cost and recording process. Another drawback of the conventional thermal transfer recording system is that recorded image is clearly kept on the ink ribbon in the form of a negative image after completion of recording operation. Therefore, there will arise a fear of leaking confidential informations from the used ink ribbon.

SUMMARY OF THE INVENTION

Hence, the present invention has been made with the foregoing background in mind and its object resides in providing an improved thermal transfer recording method and apparatus which makes it possible to effect recording on a recording paper having any required length.

Another object of the present invention is to provide improved thermal transfer recording method and apparatus which avoid useless consumption of recording paper and ink ribbon.

Still another object of the present invention is to provide improved thermal transfer recording method and apparatus which can be constructed in smaller dimensions.

Further another object of the present invention is to provide improved thermal transfer recording method and apparatus which assure that no information will be obtained from the negative image left on the ink ribbon after completion of recording operation.

Still further another object of the present invention is to provide improved thermal transfer recording method and apparatus which assure that driving of the ink ribbon is easy to be controlled.

To accomplish the above objects there is proposed according to one aspect of the invention a thermal transfer recording method of the type using a strip of repeatedly usable ink ribbon wound about an ink ribbon feeding roll, wherein the improvement consists in that the method is carried out by way of the steps of allowing recording paper and ink ribbon unwound from the ink ribbon feeding roll to come in pressure contact with a thermal head while the recording paper and the ink ribbon are superimposed one above another, transfering ink on the ink ribbon onto the recording paper by activating the thermal head while the recording paper and the ink ribbon are transported in the superimposed state, separating the ink ribbon from the recording paper, and transporting the ink ribbon backwardly by a predetermined distance at every time when recording is achieved for each of originals having the length of a single page, the predetermined distance being equal to the length of a single page of recording paper multiplied by a factor $(1-1/M)$ where M ($M \geqq 2$) is an integer not greater than the maximum number of repeated usages of the ink ribbon.

As modification from the aforesaid method there is proposed according to another aspect of the invention a thermal transfer recording method of the type using a strip of repeatedly usable ink ribbon would about an ink ribbon feeding roll, wherein the improvement consists in that the method is carried out by way of the steps of allowing recording paper and ink ribbon unwound from the ink ribbon feeding roll to come in pressure contact with a line scanning type thermal head while the recording paper and the ink ribbon are superimposed one above another, transferring ink on the ink ribbon onto the recording paper by activating the thermal head while the recording paper and the ink ribbon are transported in the superimposed state, counting the number of scanning lines required for recording image on original, separating the ink ribbon away from the recording paper, and transporting the ink ribbon backwardly by a predetermined distance at every time when recording is achieved for each of the originals having the length of a single page, the predetermined distance being equal to a distance obtainable by multiplication of the number of counted scanning lines by pitch of scanning lines and by a factor equal to $(1-1/M)$ where M is an integer greater than or equal to 2 and not greater than the maximum number of repeated usages of the ink ribbon.

On the objects, features and advantages of the present invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail hereunder with reference to the accompanying drawings which schematically illustrate a preferred embodiment thereof.

Figure 1:
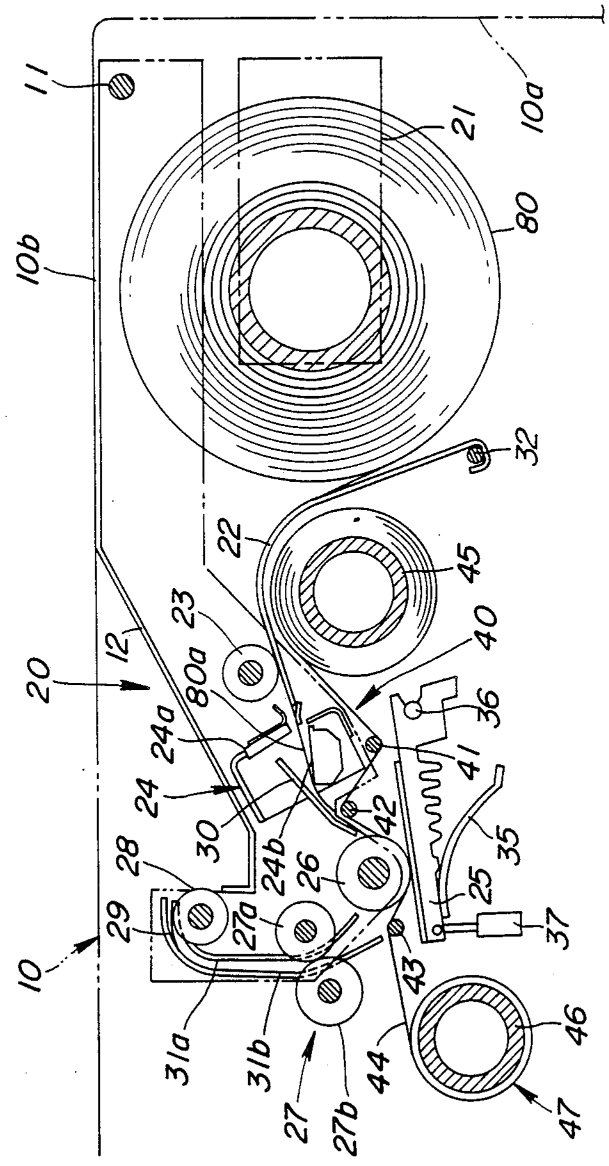
FIG. 1 is a schematic fragmental vertical sectional view of a facsimile apparatus, particularly illustrating the structure of the facsimile signal receiving apparatus incorporated therein.

Referring first to FIG. 1, the facsimile signal receiving apparatus includes an apparatus frame which is constituted by a casing frame 10*a* of which upper end part is opened to the outside and a cover frame 10*b* adapted to close the upper opening of the casing frame 10*a* by turning movement thereof. Namely, the cover frame 10*b* is turnably supported on the casing frame 10*a* by means of a support shaft 11 about which it is caused to turn. The facsimile signal receiving apparatus is fully closed with an apparatus cover 10 made of sheet material which is designed to well fit the configuration of the apparatus frame.

Further, the facsimile signal receiving apparatus includes a recording paper transportation passage 20. Specifically, the recording paper transportion passage 20 is constituted by a recording paper holder 21, a recording paper guide plate 22, a transportation roller 23, an automatic cutter 24, a thermal head 25, a platen roller 26, transportation rollers 27 comprising a driving roller 27*a* and a pinch roller 27*b*, a transportation roller 28, a leaf spring 29 adapted to come in pressure contact with the transportation roller 28 under the effect of resilient force thereof and a plurality of guide plates 30, 31*a* and 31*b* extended between the associated components. The recording paper holder 21, the transportation roller 23, the automatic cutter 24 and the thermal head 25 are arranged in the substantially horizontal direction in accordance with the illustrated order of arrangement, whereas the transportation rollers 27 and 28 are arranged in the substantially vertical direction. Among the above-described components the transportation roller 23, the automatic cutter 24, the guide plate 30, the platen roller 26, the driving roller 27*a* constituting the transportation rollers 27, the transportation roller 28, the guide plates 31*a* and 31*b* and rotational power source as well as power transmission mechanisms for the transportation roller 23, the platen roller 26, the driving roller 27*a* and the transportation roller 28, which are not shown in the drawing, are mounted on the cover frame 10*b*.

As is apparent from the drawing, the recording paper guide plate 22 is made of thin plate material having the arch-shaped configuration and includes a leaf spring at the position where it is brought in pressure contact with the transportation roller 23 under the effect of resilient force thereof. The lower end of the recording paper guide plate 22 is fixedly secured to the shaft 32 which is rotatably supported on the casing frame 10*a* so that it is caused to turn in response to turning movement of the cover frame 10*b* by actuating a lever mechanism which is not shown in the drawing. Thus, fitting and replacing of an ink ribbon feeding roll to be described later are easy to be effected.

Figure 2:
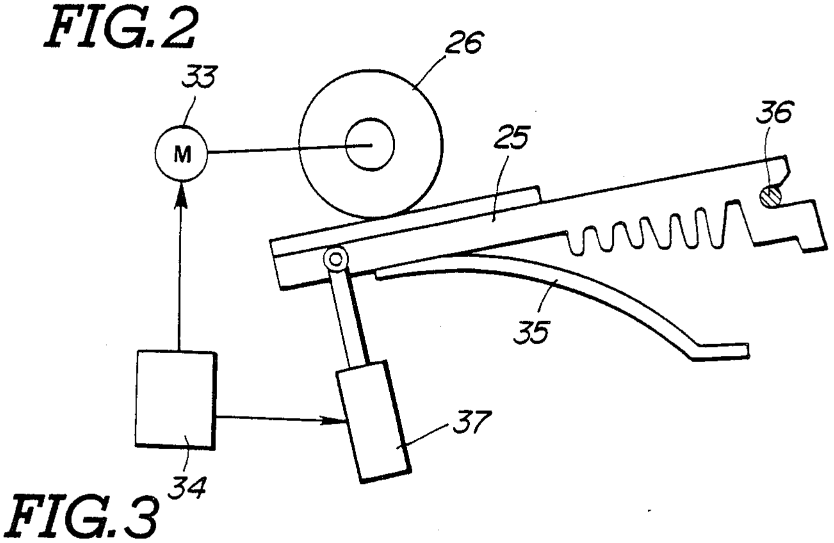
FIG. 2 is a front view of means for parting a thermal head away from a platen roller in the facsimile signal receiving apparatus in FIG. 1.

The transportation roller 23 is rotated in synchronization with rotation of the platen roller 26 by means of a stepping motor 33 as illustrated in FIG. 2 which serves as rotational power source for both the transportation roller 23 and the platen roller 26 so as to transport recording paper forwardly while the latter is clamped between the transportation roller 23 and the leaf spring on the recording paper guide plate 22 under the influence of a properly determined intensity of resilient force thereof.

Next, the automatic cutter 24 is constituted by a combination of stationary blade 24*a* and movable blade 24*b* which is operatively connected to rotational power source such as motor, rotary solenoid or the like which is not shown in the drawing. When the rotational power source is activated to turn the movable blade 24*a* upwardly, recording paper is cut off.

The platen roller is made of rubber with a shaft of metallic material extended along the axis thereof. As is best seen from FIG. 2, the platen roller 26 is located just above a group of heating resistors on the thermal head 25 so that it is rotated by means of rotational power source, power transmission mechanism and rotational speed reduction mechanism, for instance, stepping motor 33 which serves to rotate the transportation roller 23 in synchronization with rotation of the platen roller 26 and gears or timing belts which are not shown in the drawing. Thus, the platen roller 26 performs transporting operation of recording paper at a predetermined transporting speed in response to information pulses outputted from a control circuit 34 while recording paper and ink ribbon are superimposed one above another in the closely contacted state.

The thermal head 25 is constructed in the form of a line scanning type thermal head and has a lot of micro heating resistors arranged at a predetermined density (for instance, 8 pieces/mm) by the number (for instance, 2048 pieces in total) corresponding to the width of recording paper (for instance, 256 mm in the case of B4 size). When the micro heating resistors are turned on pulsewise in accordance with image informations to be recorded, the ink ribbon which has come in contact with them is locally heated up and the layer of solid ink is locally molten whereby a visual image is built on the recording paper. As illustrated in the drawing, the thermal head 25 is provided with pressing means, for instance, leaf spring 35 which allows the thermal head 25 to be turned in the clockwise direction (in the upward direction) about a support shaft 36. Thus, the thermal head 25 comes in pressure contact with the platen roller 26 with both the ink ribbon and the recording paper being interposed therebetween. On the contrary, to assure that the thermal head 25 is released from the pressure contacted state, it is turned in the anticlockwise direction (in the downward direction) by actuating pressure contact releasing means, for instance, electromagnetic actuator 37 and thereby a clearance is produced between the thermal head 25 and the platen roller 26.

The guide plates 31*a* and 31*b*, the transportation rollers 27 and 28 and the leaf spring 37 adapted to come in pressure contact with the transportation roller 28 under the effect of resilient force thereof perform transporting operation of the recording paper on which image informations have been received from the apparatus by rotating the transportation rollers 27 and 28 by means of rotational power source which is not shown in the drawing, for instance, a stepping motor. Incidentally, in the drawing (FIG. 1) reference numeral 12 designates a recorded paper storage tray in which recorded papers discharged from the apparatus are temporarily stored in the layered structure.

The facsimile signal receiving apparatus includes also an ink ribbon transportation passage 40. Specifically, the ink ribbon transportation passage 40 is constituted by a plurality of guide bars 41, 42 and 43. The ink ribbon 44 is transported via the guide bars 41 and 42, the space as defined between the thermal head 25 and the platen roller 26 and the guide bar 43.

Figure 3:
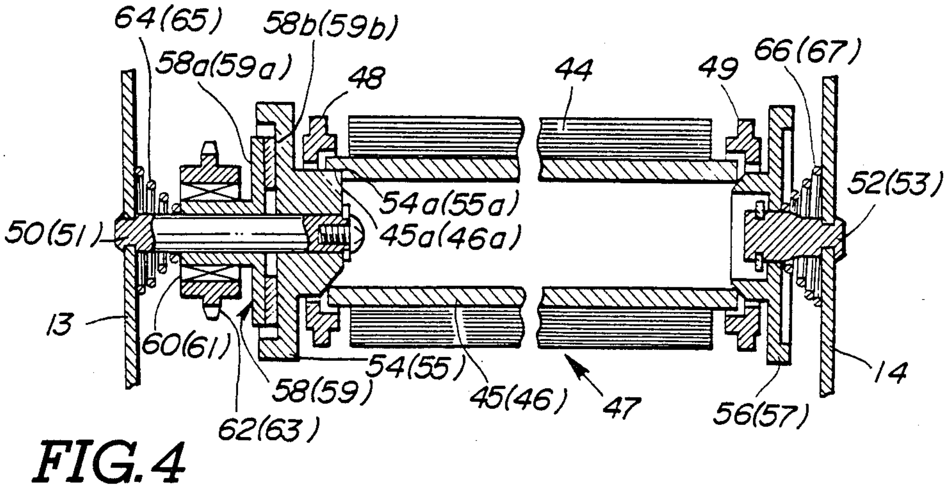
FIG. 3 is a vertical sectional view of ink ribbon holding means in the facsimile signal receiving apparatus.

It should be noted that the ink ribbon 44 functions as master material for effecting thermal transfer recording and has the layered structure comprising a condensor paper (base paper) having a very thin thickness, for instance, 16 microns, a coating layer of mixture of polyamide resin and carbon black having a thickness of about 10 microns, the layer of mixture being coated on the condensor paper and serving as adhesive layer, and a layer of ink-containing die, material having a lower melting temperature and carbon black, the layer of ink being located on the layer of mixture. It is confirmed that the thus prepared ink ribbon 44 can be repeatedly used at about 10 times. Further, it is found that when the ink ribbon 44 of the above-mentioned type is employed for the apparatus, it has a recording density of 1.2 at the first time and it has a recording density of 0.6 at the tenth time. This means that a recording density of the ink ribbon 44 decrease stepwise as it is repeatedly used. A part of the ink ribbon 44 is wound about the ink ribbon feeding roll 45 and another part of the same is wound about the ink ribbon winding roll 46. Both the ink ribbon feeding roll 45 and the ink ribbon winding roll 46 are housed in a cassette 47. As illustrated in FIG. 3, the ink ribbon feeding roll 45 and the ink ribbon winding roll 46 are rotatably mounted on the side plates 48 and 49 constituting the cassette 47 and the side plates 48 and 49 are connected to one another by way of stays or the like means. As is apparent from FIG. 1, the ink ribbon cassette 47 is disposed in the area located below the recording paper transportation passage 20.

FIG. 3 illustrates by way of a sectional view how the ink ribbon cassette 47 is held by means of the frames 13 and 14 in the casing 10. Both the frames 13 and 14 have shafts 50, 51, 52 and 53 fixedly secured thereto so that reels 54, 55, 56 and 57 are rotatably mounted on the shafts 50, 51, 52 and 53. Among the above-mentioned reels the reels 54 and 55 are operatively engaged to the ink ribbon feeding roll 45 and the ink ribbon winding roll 46 by fitting projection 54*a* and 55*a* on the righthand end faces of the reels 54 and 55 into recesses 45*a* and 46*a* on the lefthand end face of the ink ribbon feeding roll 45 and the ink ribbon winding roll 46. Further, joint members 54 and 55 are rotatably mounted on the shafts 50 and 51 in the area as defined between the frame 13 and the reels 54 and 55. The joint members 58 and 59 are integrally formed with circular discs 58*a* and 59*a* on the righthand side thereof as seen in the drawing and friction plates 58*b* and 58*b* and adhesively attached to the circular discs 58*a* and 59*a*. Further, one-way clutches 60 and 61 are mounted on the joint members 58 and 59 and sprockets 62 and 63 are mounted on the one-way clutches 60 and 61 so that the joint members 58 and 59 are operatively associated with the sprockets 62 and 63 to assure rotation only in a certain direction. The joint members 58 and 59 are normally biased in the rightward direction as seen in FIG. 3 under the effect of the resilient force of compression springs 64 and 65 which are disposed in the area as defined between the joint members 58 and 59 and the frame 13 whereby the reels 54 and 55 come in pressure contact with the ink ribbon feeding roll 45 and the ink ribbon winding roll 46 with the friction plates **58*b* and 59*b* being interposed therebetween. On the other hand, the reels 56 and 57 are normally biased in the leftward direction as seen in FIG. 3 under the effect of resilient force of compression springs 66 and 66 which are disposed in the area as defined between the frame 14 and the reels 56 and 57 whereby the left-hand end faces of the reels 56 and 57 come in pressure contact with the righthand end faces of the ink ribbon feeding roll 45 and the ink ribbon winding roll 46**.

Removal of the ink ribbon cassette 47 from the frames 13 and 14 of the casing 10 is achieved by way of the steps of pushing the reels 56 and 57 against resilient force of the compression springs 66 and 67 by displacing the ink ribbon cassette 47 in the rightward direction as seen in FIG. 3 and then disengaging the reels 54 and 55 from the ink ribbon feeding roll 45 and the ink ribbon winding roll 46.

On the contrary, fitting of the ink ribbon cassette 47 to the frames 13 and 14 of the casing 10 is achieved by way of the steps of pushing the reels 56 and 57 against resilient force of the compression springs 66 and 67 with the use of the ink ribbon cassette 47 itself, engaging the ink ribbon feeding roll 45 and the ink ribbon winding roll 46 to the reels 56 and 57 on the righthand side and then engaging the ink ribbon feeding roll 45 and the ink ribbon winding roll 46 to the reels 54 and 55 on the lefthand side as seen in the drawing.

Figure 4:
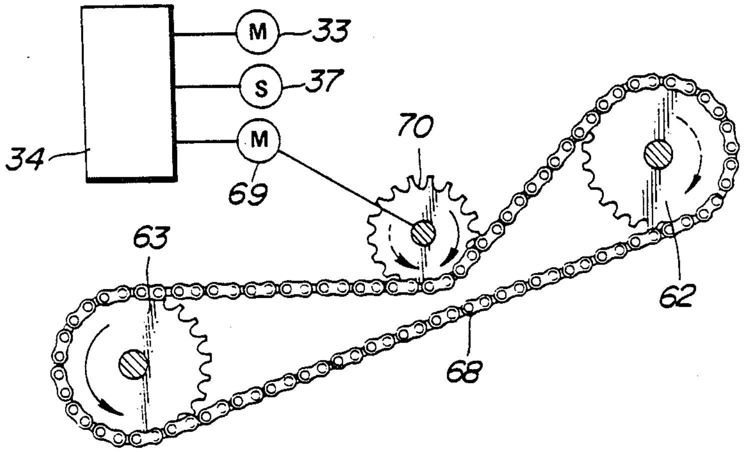
FIG. 4 is a schematic front view of an ink ribbon driving mechanism in the facsimile signal receiving apparatus.

The ink ribon feeding roll 45 and the ink ribbon winding roll 46 are rotated by means of a driving mechanism as illustrated, for instance, in FIG. 4. In the drawing reference numeral 68 designates an endless roller chain comprising a number of links, bushes and pins. The roller chain is endlessly extended around the sprockets 62 and 63 on the ink ribbon feeding roll 45 and the ink ribbon winding roll 46. The sprockets 62 and 63 are rotated via the roller chain 68 by rotating a sprocket 70 fixedly mounted on a shaft of rotational power source, for instance, stepping motor 69 under control of a control circuit 34.

Specifically, when the sprocket 70 is rotated in the direction as identified by an arrow mark scribed with real lines in FIG. 4 as the stepping motor 69 is rotated, the sprocket 63 in the area of the ink ribbon winding reel 46 is caused to rotate in the direction as identified by an arrow mark scribed with real lines. As the sprocket 63 is rotated in the direction as defined above, the one-way clutch 61 is brought in the locked state whereby rotational power of the sprocket 63 is transmitted to the reel 55 via the joint member 59. Thus, the ink ribbon winding roll 46 is rotated in the same direction as the sprocket 63. At this moment the sprocket 62 in the area of the ink ribbon feeding roll 45 is rotated in the direction reverse to that as identified by an arrow mark scribed with dotted lines. While the sprocket 62 is rotated in the direction as defined above, the one-way clutch 60 is kept in the freely rotatable state whereby rotational power of the sprocket 62 is not transmitted to the joint member 58. Accordingly, in this case, rotational power outputted from the stepping motor 69 is transmitted only to the ink ribbon winding roll 46 and thereby only the ink ribbon winding roll 46 is rotated. At this moment the ink ribbon feeding roll 45 is rotated as a follower roll by way of the ink ribbon 44. It should be noted that since the ink ribbon feeding roll 45 is affected by frictional force which is caused by means of the friction plate **58*b* of the joint member 58, the ink ribbon 44** is stretched under the influence of a properly determined intensity of tension force.

On the contrary, when the sprocket 70 is rotated in the direction as identified by an arrow mark scribed with dotted lines in FIG. 4 as the stepping motor 69 is rotated (in the reverse direction), the sprocket 62 in the area of the ink ribbon feeding roll 45 is caused to rotate in the direction as identified by an arrow mark scribed with dotted lines. While the sprocket 62 is rotated in the direction as defined above, the one-way clutch 60 is kept in the locked state whereby rotational power of the sprocket 62 is transmitted to the reel 54 via the joint member 58. Thus, the ink ribbon feeding roll 45 is rotated in the same direction as the sprocket 62. At this moment the sprocket 63 in the area of the ink ribbon winding reel 46 is rotated in the direction reverse to that as identified by an arrow mark scribed with real lines. While the sprocket 63 is rotated in the direction as defined above, the one-way clutch 61 is kept in the freely rotatable state and rotational power of the sprocket 63 is not transmitted to the joint member 59. Accordingly, in this case, rotational power outputted from the stepping motor 69 is transmitted only to the ink ribbon feeding roll 45 and only the ink ribbon feeding roll 45 is rotated so that the ink ribbon winding roll 46 is caused to rotate as follower roll by way of the ink ribbon 44. Since the ink ribbon winding roll 46 is affected by frictional force which is caused by means of the friction plate **59*b* of the joint member 59 and transmitted thereto via the reel 55 at this moment, the ink ribbon 44** is stretched under the influence of a properly determined intensity of tension force.

The ink ribbon feeding roll 45, the ink ribbon winding roll 46 and the ink ribbon cassette 47 with the ink ribbon 44 contained therein are arranged in such a manner that the ink ribbon 44 is interposed between the thermal head 25 and the platen roller 26 while it comes in contact with the guide bars 41, 42 and 43, as illustrated in FIG. 1.

A roll of recording paper 80 is held on the recording paper holding 21 and the leading end of recording paper **80*a* unwound from the recording paper roll 80 is first drawn to the position located between the thermal head 25 and the platen roller 26 via the recording paper guide plate 22, the transportation roller 23, the automatic cutter and the guide bar 42**. Further, it is drawn further to the position behind the group of micro heating resistors by a distance of several millimeters.

When the cover frame **10*b* is opened away from the casing frame 10*a* of the facsimile signal receiving apparatus by turning movement, the transportation roller 23, the platen roller 26, the automatic cutter 24, the driving roller 27*a* constituting the transportation roller 27, the transportation roller 28 and the guide plates 30, 31*a* and 31*b* are displaced upwardly together with the cover frame 10*b* and at the same time the recording paper guide plate 22 is turned in the clockwise direction as seen in the drawing. As a result the area where the recording paper holder 21 and the ink ribbon cassette 47 are to be housed are exposed to the outside. While the above-described state is maintained, an ink ribbon cassette 47 and a roll of recording paper 80 can be loaded on the casing frame 10*a*. Next, when the cover frame 10*b* is closed, the transportation roller 23, the platen roller 26, the automatic cutter 24, the driving roller 27*a*** constituting the transportation rollers 27, the transportation roller 28 and the guide plates 30, 31*a* and 31*b* are restored to their original position and at the same time the recording paper guide plate 22 resumes its original position.

Figure 5:
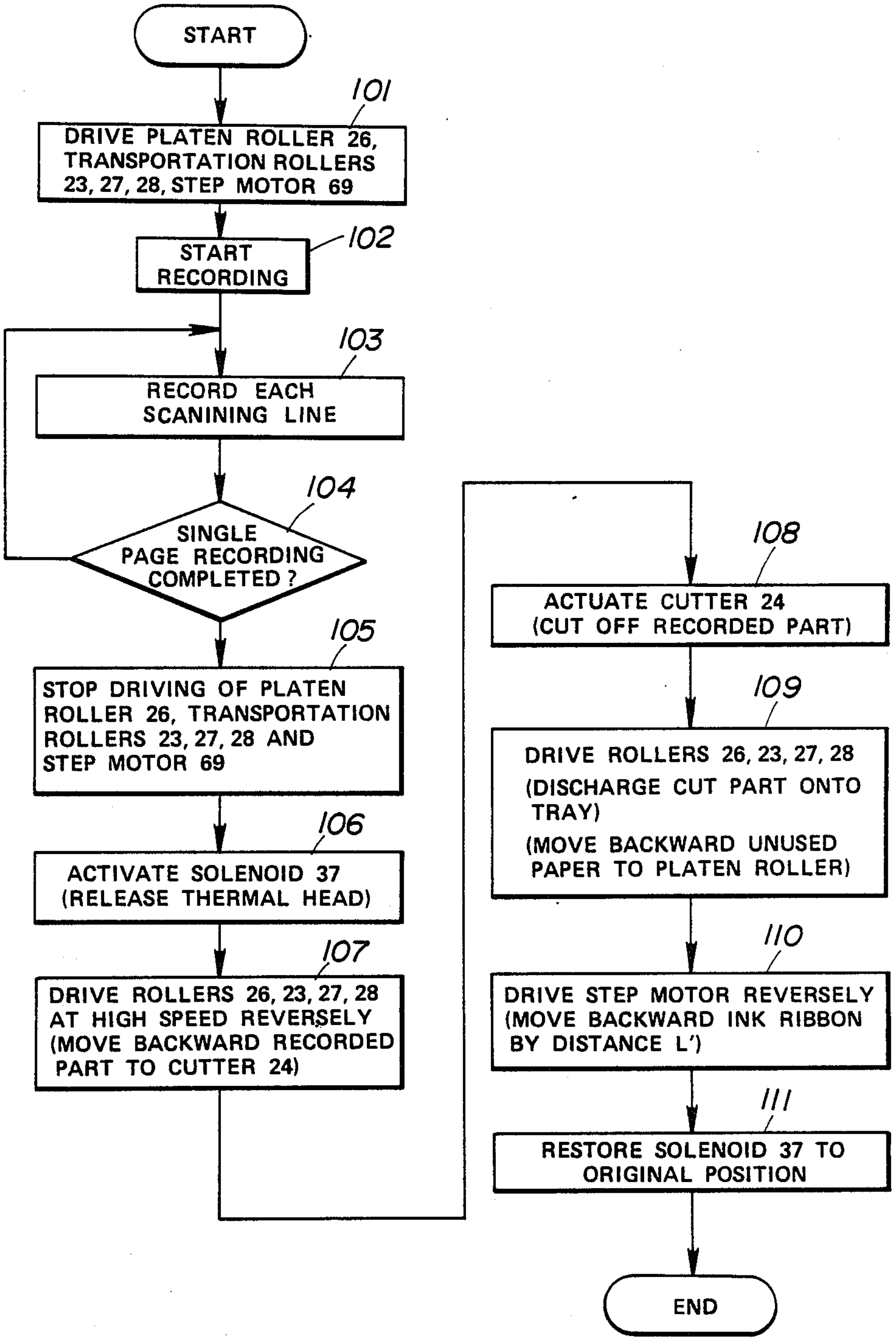
FIG. 5 is a flow chart illustrating the steps of controlling movement of recording paper and ink ribbon in the facsimile signal receiving apparatus.

Next, operation of the facsimile signal receiving apparatus as constructed in the above-described manner will be described below with reference to a flow chart as illustrated in FIG. 5.

When the facsimile signal receiving apparatus initiates its operation, the leading end of recording paper 80*a* unwound from the recording paper roll 80 is drawn to the position behind the group of micro heating resistors on the thermal head 25 by a distance of about 3 mm where the recording paper 80*a* is clamped between the thermal head 25 and the platen roller 26.

Next, the platen roller 26, the transportation rollers 26, 27 and 28 and the stepping motor 69 are driven in response to signals received via cable or channel whereby transportation of the recording paper 80*a* and the ink ribbon 44 is started (step 101). Subsequent to the step the thus received signals are subjected to the electrical processing such as modulating, coding and amplifying so as to allow them to be converted to image information signals which in turn are transmitted to the thermal head 25. Thus, the layer of solid ink on the ink ribbon 44 is locally molten in accordance with the recorded pattern on the basis of principle of thermal transfer recording system and molten ink is transferred onto the recording paper 80*a* with the aid of the platen roller 26 whereby recording is effected (step 102). Recording is carried out for each of scanning lines (step 103). On completion of recording across one scanning line the recording paper 80*a* and the ink ribbon 44 are transported by a distance equal to one pitch of scanning lines by means of the platen roller 26 and the transportation roller 23 both of which are rotated by the common stepping motor 33, while they are maintained in the closely contacted state. While recording is repeatedly carried out in that way, the direction of transportation of the ink ribbon 44 is changed at the guide bar 43 and thereby the recording paper 80*a* is parted away from the ink ribbon 44 because it tends to move further linearly due to its rigidity. The thus separated recording paper 80*a* is transported further along the guide plates 31*a* and 31*b* by rotating the driving roller 27*a* and the transportation roller 28 in cooperation with the pinch roller 27*b* and the leaf spring 29. It should be added that rotation of the driving roller 27*a* constituting the transportation rollers 27 is synchronized with rotation of the platen roller 26. On completion of recording operation for a single page having the length equal to size of an original of which image signals have been transmitted to the facsimile signal receiving apparatus (step 104), the platen roller 26, the transportation rollers 23, 27 and 28 and the stepping motor 69 stop their rotation (step 105). Next, an electromagnetic actuator 37 which serves as means for releasing the thermal head 25 from the contacted state is actuated (step 106). Thus, the thermal head 106 is parted away from the platen roller 26 so as to allow both the recording paper 80*a* and the ink ribbon 44 to be released from the pressed state and the stepping motor 33 serving as a common rotational power source for both the platen roller 26 and the transportation roller 23 and another stepping motor for rotating the transportation rollers 27 and 28 (not shown) are driven in the reverse direction (step 107). After recording operation has fully finished, the recording paper 80*a* is transported backwardly. When the tail end of a part of recording paper 80*a* having the length of a single page reaches the position where the stationary blade 24*a* comes in cutting contact with the movable blade 24*b*, that is, the cutting position in the automatic cutter 24, the stepping motor 33 and the aforesaid another stepping motor for the transportation rollers 27 and 28 (not shown) are caused to stop their rotation immediately and thereafter the movable blade 24*b* in the automatic cutter 24 is actuated to cut the part of recording paper 80*a* on which recording has been effected to the substantially same length as that of an original of which image information signals have been transmitted to the apparatus (step 108). Immediately after completion of cutting operation the stepping motors for rotating the platen roller 26, the transportation roller 23 and the transportation rollers 27 and 28 are driven in the normal direction at a high rotational speed so as to transport the recording paper 80*a* forwardly again (step 109). The thus cut part of recording paper is transported further by rotating the driving roller 27*a* and the transportation roller 28 in cooperation with the pinch roller 27*b* and the leaf spring 29 until it is discharged from the apparatus. Recorded paper sheets are stored in the recorded paper storage tray 12 in the layered structure. On the other hand, the leading end of unrecorded part of recording paper 80*a* is drawn to the position behind the group of micro heating resistors on the thermal head 25 by a predetermined distance, for instance, 3 mm. At this moment the stepping motor 33 for rotating both the platen roller 23 and the transportation roller 23 stops its rotation.

On the other hand, as the stepping motor 69 is driven in the reverse direction (step 110), the ink ribbon feeding roll 45 is rotated in the clockwise direction as seen in FIG. 1 at a predetermined rotational speed and thereby the ink ribbon 44 inclusive the recorded part thereof is transported backwardly by a predetermined distance L′ which is shorter than the length L of a single page. Next, the solenoid 37 for actuating the thermal head 25 is restored to its original position (step 111) so that the recording paper 80*a* and the ink ribbon 44 are clamped between the thermal head 25 and the platen roller 26 under the effect of pressure. Now, the apparatus is ready to start next recording operation.

Incidentally, a part of the ink ribbon 44 having the length L′ which has been transported backwardly after completion of recording operation for a single page is put in use again for next recording operation. In the illustrated embodiment of the invention the length L′ may be equal to the length of an original having, for instance, a size of B4 multiplied by a factor $(1-1/M)$, when it is assumed that the number of times of repeated usage of the ink ribbon 44 is designated by reference letter M. Further, when the number of scanning lines required for recording of a single page is counted by using any suitable means, for instance, pulse counter for counting scanning clock signals and as a result of counting it amounts to N, the length L′ may be determined as follows.

$L' = N(1-1/M)$ X pitch of scanning lines In the last mentioned case any part on the ink ribbon can be repeatedly used by about N times, even when recording of received signals is effected for original having different size.

Next, description will be made as to operation of the ink ribbon 44 in the case of $M=3$ with reference to FIGS. 6(*a*) to 6(*j*) as follows.

Figure 6:
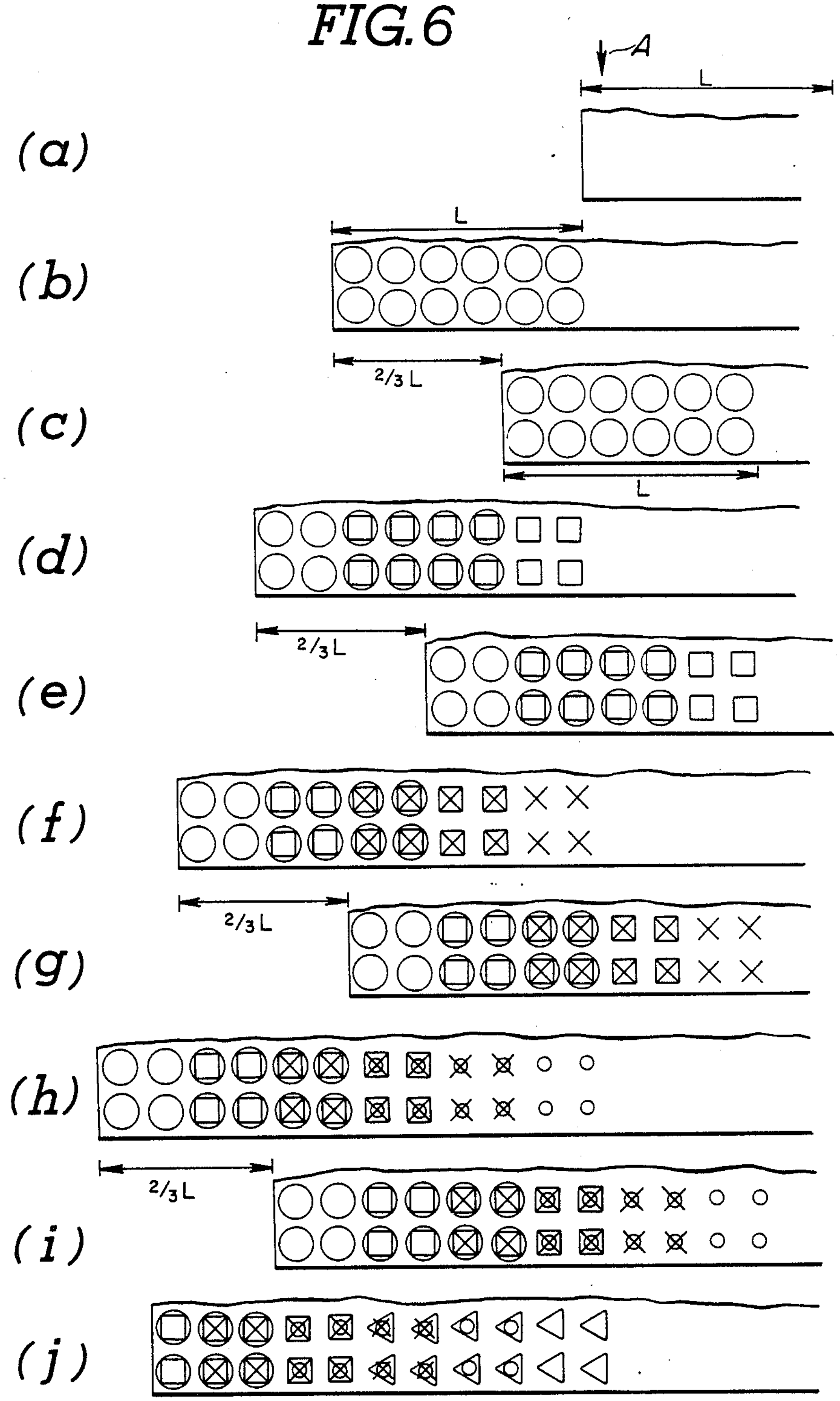
FIGS. 6(*a*) to 6(*j*) are fragmental plan views of a part of the ink ribbon respectively, particularly illustrating how the ink ribbon is transported forwardly and backwardly so as to allow it to be put in repeated use.

FIG. 6(*a*) shows by way of a fragmental plan view the leading end part of unused ink ribbon and an arrow mark A shows the position where a group of micro heating resistors are arranged on the thermal head 25. FIG. 6(*b*) shows the state of the ink ribbon after recording (as identified by small circle marks) is effected by a distance of L equal to the length of a single page. FIG. 6(*c*) shows that the ink ribbon is transported backwardly from the position in FIG. 6(*b*) by a distance of $(1-1/M)$ L and it is ready to effect recording (as identified by small square marks) for a second page. FIG. 6(*d*) shows that recording for the second page has been finished. As is apparent from FIG. 6(*d*), the ink ribbon is repeatedly used at twice times in the area located within the extent of $\frac{1}{3}$L to L as measured from the leading end of the ink ribbon. Next, the ink ribbon is transported backwardly from the position in FIG. 6 (*d*) by a distance of $\frac{2}{3}$L (see FIG. 6(*e*)). Now, it is ready to effect recording for a third page. FIG. 6(*f*) shows that recording (as identified by small X marks) for the third page has been finished. In the illustrated state the ink ribbon is repeatedly used at three times in the area located within the extent of $\frac{2}{3}$L to 3/3L as measured from the leading end of the ink ribbon. Next, the ink ribbon is transported backwardly from the position in FIG. 6(*f*) by a distance of $\frac{2}{3}$L (see FIG. 6(*g*)). FIG. 6(*h*) shows that recording (as identified by smaller circle marks) has been effected for a fourth page. Thereafter, the ink ribbon is transported backwardly from the position in FIG. 6(*h*) by a distance of $\frac{2}{3}$L (see FIG. 6(*i*)). Finally, FIG. 6(*j*) shows that recording (as identified by small triangle marks) has been finished for a fifth page.

As is apparent from FIGS. 6(*d*) to (*j*), the area located within the extent of the leading end of the ink ribbon to $\frac{1}{3}$L as measured therefrom is used by a single time, the area located within the extent of $\frac{1}{3}$L to $\frac{2}{3}$L as measured from the leading end of the ink ribbon is repeatedly used at twice times and the area located behind the position of $\frac{2}{3}$L as measured from the leading end of the ink ribbon is repeatedly uses at three times.

As will be readily apparent from the above description, the repeatedly used part of the ink ribbon 44 has a number of tripled negative images recorded thereon. As a result, the tripled negative images cannot be practically recognized by any other person.

While the present invention has been described above with respect to the case where it is applied to a facsimile signal receiving apparatus in which a roll of recording paper is used as recording medium, it should of course be understood that it should not be limited only to this but it may be applied not only to a facsimile apparatus in which a number of sheet papers are used as recording medium but also to a printer.

What is claimed is:

1. A thermal transfer recording method of the type using a roll of repeatedly usable ink ribbon, said method comprising the steps of:

allowing record paper and ink ribbon unwound from said roll of ink ribbon to come in pressure contact with a thermal head while the recording paper and the ink ribbon are superimposed one above another, transferring ink on the ink ribbon onto the recording paper by activating said thermal head while the recording paper and the ink ribbon are transported in the superimposed state, separating the ink ribbon away from the recording paper, and transporting the ink ribbon backwardly by a predetermined distance at every time when recording is achieved for an original having the length of a single page, said predetermined distance being equal to the length of a single page of recording paper multiplied by a factor equal to $1-1/M$, where M is an integer greater than or equal to two and not greater than the maximum number of repeated usages of the ink ribbon.

2. A thermal transfer recording method of the type using a roll of repeatedly usable ink ribbon, said method comprising the steps of:

allowing recording paper and ink ribbon unwound from said roll of ink ribbon to come in pressure contact with a line scanning type thermal head while the recording paper and the ink ribbon are superimposed one above another, transferring ink on the ink ribbon onto the recording paper by activating said thermal head while the recording paper and the ink ribbon are transported in the superimposed state, counting the number of scanning lines required for recording image on an original, separating the ink ribbon away from the recording paper, and transporting the ink ribbon backwardly by a predetermined distance at every time when recording is achieved for each of the originals having the length of a single page, said predetermined distance being equal to a distance obtainable by multiplication of the number of the counted scanning lines by pitch of scanning lines and by a factor equal to $1-1/M$, where M is an integer greater than or equal to two and not greater than the maximum number of repeated usages of the ink ribbon.

* * * * *